United States Patent
Hurd

(10) Patent No.: US 6,746,068 B1
(45) Date of Patent: Jun. 8, 2004

(54) REPLACEMENT TAILGATE AND RAMP FOR TRUCKS

(76) Inventor: Steve Hurd, 566 A Sharon Dr., Lawrenceville, GA (US) 30045

( * ) Notice: Subject to any disclaimer, the term of this patent is extended or adjusted under 35 U.S.C. 154(b) by 0 days.

(21) Appl. No.: 10/408,906

(22) Filed: Apr. 9, 2003

(51) Int. Cl.$^7$ .................................................. B60P 1/43
(52) U.S. Cl. ......................... 296/50; 296/51; 296/57.1
(58) Field of Search .......................... 296/26.01, 26.08, 296/26.11, 50, 51, 58, 57.1, 61, 62; 414/537; 14/71.1; 182/157, 48, 195

(56) References Cited

U.S. PATENT DOCUMENTS

| | | | | |
|---|---|---|---|---|
| 2,603,529 A | * | 7/1952 | Troth | 296/61 |
| 3,352,440 A | * | 11/1967 | Wilson | 414/537 |
| 3,642,156 A | | 2/1972 | Stenson | |
| 3,655,082 A | * | 4/1972 | Garrett | 414/462 |
| 3,713,553 A | | 1/1973 | Curtis et al. | |
| 3,837,513 A | * | 9/1974 | Adamek | 414/462 |
| 4,571,144 A | | 2/1986 | Guidry et al. | |
| 4,864,672 A | * | 9/1989 | Altieri et al. | 14/69.5 |
| 4,864,673 A | | 9/1989 | Adaway et al. | |
| 5,156,432 A | * | 10/1992 | McCleary | 296/61 |
| 5,211,437 A | * | 5/1993 | Gerulf | 296/61 |
| 5,273,335 A | * | 12/1993 | Belnap et al. | 296/61 |
| 5,342,105 A | * | 8/1994 | Miles | 296/61 |
| 5,597,195 A | * | 1/1997 | Meek | 296/61 |
| 5,752,800 A | | 5/1998 | Brincks et al. | |
| D401,731 S | | 11/1998 | Jeruss | |
| 5,988,725 A | * | 11/1999 | Cole | 296/61 |
| 6,099,233 A | | 8/2000 | Craik | |
| 6,120,081 A | * | 9/2000 | Collins | 296/61 |
| 2002/0172584 A1 | * | 11/2002 | Huggins | 414/537 |
| 2004/0032142 A1 | * | 2/2004 | Sherrer et al. | 296/61 |

* cited by examiner

*Primary Examiner*—D. Glenn Dayoan
*Assistant Examiner*—H. Gutman
(74) *Attorney, Agent, or Firm*—John D. Gugliotta; Olen L. York, III

(57) ABSTRACT

A replacement tailgate and ramp includes a first section and an angularly disposed second section. When deployed, the first section aligns substantially parallel to and coplanar with the bed surface of a utility or pick-up truck. The second section is angularly disposed about the first section to provide a ramp, thereby allowing ingress to and egress from the truck bed. The angular disposition between the first and second sections is maintained by a pair of reinforcement members positioned about the lateral margins of the first and second sections. A pair of posts projecting from the first section are inserted into cavities in the bed of the truck, thereby allowing pivoting movement of the tailgate/ramp apparatus. The first and second sections are covered by a lattice covering so as to provide a frictionally enhanced walking surface. A pair of securement mechanism are provided to impinge the movement of the tailgate/ramp apparatus.

10 Claims, 5 Drawing Sheets

REPLACEMENT TAILGATE AND RAMP FOR TRUCKS

RELATED APPLICATIONS AND DISCLOSURES

The present application was first described in Disclosure Document Registration 516,302 filed on Aug. 13, 2002 under 35 U.S.C. § 122, 37 C.F.R. § 1.14 and MPEP § 1706. There are no previous nor currently any co-pending applications anywhere in the world.

BACKGROUND OF THE INVENTION

1. Field of the Invention

The present invention relates generally to tailgate ramps, and more particularly to a tailgate ramp installed to replace existing conventional tailgates, wherein the ramp is provided with certain features to improve ease of use and safety in loading and unloading of equipment or other transportable items.

2. Description of the Related Art

With automobile sales at an all-time high, the popularity of the pick-up style truck as an everyday vehicle is more wide spread than ever before. Their utility and convenience in hauling items, coupled with the availability of luxury interiors and extended cab space, have made the pickup a popular alternative to other vehicles. Many pickup trucks owners use their trucks for hauling smaller wheeled vehicles such as motorcycles, ATV's and the like, or for hauling landscaping equipment such as lawnmowers, snow-blowers, edging machines, roto-tillers or other similar yard care equipment. Usually, the use of ramps are required to aid in moving equipment into and out of the truck bed. However, these ramps take time to set up and may be bulky or awkward in size to increase the difficult of assembly and disassembly. Additionally, even if they are set up properly, they may slip during loading or unloading with costly or dangerous consequences. Finally, when not in use, the ramps must be stored somewhere. Accordingly, the need has arisen for a means by which wheeled equipment may be loaded and unloaded from pickup truck beds without the disadvantages associated with conventional ramps.

A search of the prior art did not disclose any patents that read directly on the claims of the instant invention; however, the following references were considered related:

U.S. Pat. No. 6,099,233, issued in the name of Craik, discloses a vehicle ramp having a pair of stringers and slidable rungs joined by chain;

U.S. Pat. No. 5,988,725, issued in the name of Cole, discloses a foldable tailgate ramp for pickup trucks, wherein the ramp comprises three rectangular sections hingedly affixed to one another for folding and unfolding of the ramp between a deployed and a stored position;

U.S. Pat. No. 5,762,800, issued in the name of Brincks et al., discloses a combination pickup truck bed extender and foldable ramp, wherein the ramp is mounted to the inside of the truck bed and comprises collapsible sections that are adjustable between an unfolded position for use as a ramp or a secured position that allows for an extension of the truck bed;

U.S. Pat. No. 5,273,335, issued in the name of Belnap et al., discloses a combination ramp and tailgate structure for permanent replacing a conventional truck tailgate, wherein the ramp and tailgate structure comprise four rectangular frame members slidably coupled together and movable between a nested or extended position, respectively;

U.S. Pat. No. 4,864,673, issued in the name of Adaway et al., discloses a folding ramp comprising an attachment frame, a foldable support structure mounted to the attachment frame by pivotable hinges, and a telescoping deck structure interconnected to rectangular plates;

U.S. Pat. No. 4,571,144, issued in the name of Guidry et al., discloses a foldable loading ramp for a truck tailgate, wherein the ramp includes a plurality of adjacently affixed ramp sections allowing the ramp to fold and unfold;

U.S. Pat. No. 3,713,553, issued in the name of Curtis et al., discloses a truck loading ramp comprising two hinged ramp sections that fold and unfold;

U.S. Pat. No. 3,642,156, issued in the name of Stenson, discloses a folding ramp device that attaches to a truck tailgate having a multiple number of folding sections or members; and U.S. Patent No. Des. 401,731, issued in the name of Jeruss, discloses an ornamental design for a ramp for loading and unloading material on or from trucks, wherein the ramp comprises a single rail have a pair of legs for properly angling the ramp from the truck tailgate to the ground or other surface.

Consequently, a need has been felt for providing an apparatus and method which overcomes the problems cited above, improving the structural arrangement and compactness of truck ramps and replacement tailgate apparatuses.

SUMMARY OF THE INVENTION

It is therefore an object of the present invention to provide an improved replacement tailgate and ramp for pickup trucks.

It is another object of the present invention to provide an improved tailgate/ramp having a first section parallel to the truck bed and a second section angularly depending from the first section so as to contact the ground at an inclined angle appropriate for loading and unloading of material onto or from a truck.

It is another object of the present invention to provide an improved tailgate/ramp having a pair of reinforcing members affixed about the lateral margins of the first and second sections, thereby providing structural integrity and added strength to the tailgate/ramp apparatus.

It is another object of the present invention to provide an improved tailgate/ramp having a centrally aligned recess between a pair of longitudinally elongated inclined planes, wherein the recess is provided to allow a user to walk a piece of equipment into or out from the truck without having to access the second section by foot.

It is another object of the present invention to provide an improved tailgate/ramp that pivots between a deployed position and a retracted position.

It is another object of the present invention to provide an improved tailgate/ramp that is securely locked within the truck bed by securement means, thereby preventing unnecessary and/or damaging movement of the tailgate/ramp during transportation and/or storage.

Briefly described according to one embodiment of the present invention, a replacement tailgate and ramp is a tailgate for pickup trucks with enhanced features. The tailgate not only functions as a conventional tailgate, but also provides for an integral ramp system to allow for the easy loading and unloading of wheeled devices. The portion of the tailgate closest to the truck is flat in nature and allows it to lock in the upright position when closed, or remain horizontally level when closed. Another section of the tailgate is attached to this angled section at a 60° angle that contacts the grade when opened. The center portion of this angled section is open to allow a person to walk equipment up the ramps from the center position. The interior of the invention is provided with a steel grate system that allows easy traction for wheeled equipment and reduced wind resistance when stowed and traveling. The use of the replacement tailgate and ramp allows equipment to be easily moved into and out of truck beds without the difficulty or safety issues associated with conventional ramp systems.

Other objects of the present invention include providing a device that is easily installed, serviced and maintained.

Yet another object of the present invention includes the use of a lattice covering affixed to the sections so as to reduce the aerodynamic resistance and/or drag on the vehicle during transportation of the vehicle.

Yet another object of the present invention provides an improved tailgate/ramp having a second section divided into an upper section and a lower section and coupled about a hinge, thereby allowing the lower section to pivot adjacent to the upper section, lowering the height of the tailgate/ramp below the top portion of the cab, and further reducing the aerodynamic resistance and/or drag on the vehicle during transportation.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
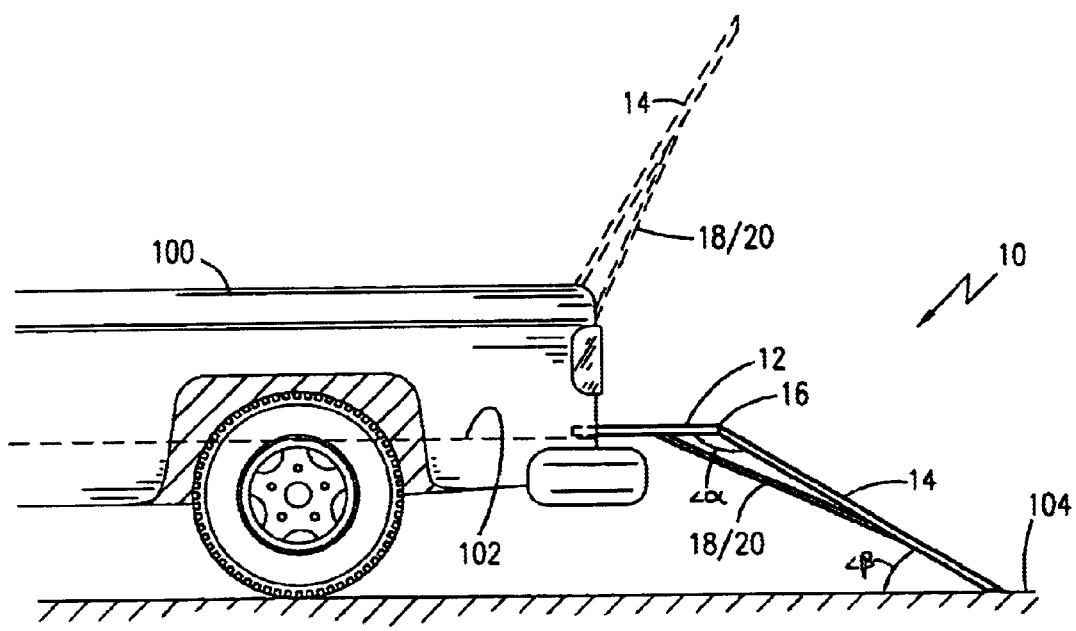
FIG. 1 is a side view of a replacement tailgate and ramp for a pickup truck illustrating a retracted (phantom lines) and deployed positioning of the tailgate/ramp, wherein the tailgate/ramp includes a first section parallel to the truck bed, a second section angularly depending from the first section so as to contact the ground or street, and a pair of reinforcing members (only one shown from side view) to further stabilize and strengthen the tailgate/ramp.
Figure 2:
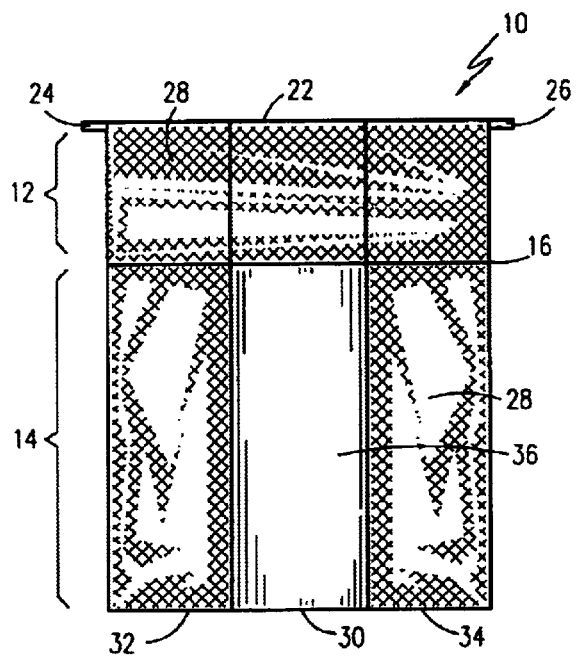
FIG. 2 is a top view of the tailgate/ramp, illustrating the quadrilateral perimeter of the first and second sections, the lattice covering that is affixed to the first and second sections, and the division of the second section into two longitudinally elongated inclined planes and a centrally aligned recess intermediate to the inclined planes.

The best mode for carrying out the invention is presented in terms of its preferred embodiment, herein depicted within the FIGS. 1 through 8.

1. Detailed Description of the Figures

Referring now to FIG. 1, FIG. 2 and FIG. 5 through FIG. 7, a replacement tailgate and ramp 10 is shown in accordance with the preferred embodiment of the present invention. The replacement tailgate and ramp 10 comprises two adjacent sections 12 and 14 permanently affixed to one another about a seam or weld 16. The first section 12 is substantially parallel to and substantially coplanar to the bed surface 102 of the truck 100. The second section 14 depends from the first section 12 and angularly disposed at an angle "<$\alpha$" complimentary to an angle "<$\beta$", wherein "<$\alpha$" is approximately 140° to 160° in relation to the horizontal plane of the first section 12, and "<$\beta$" is approximately 20° to 40° in relation to the horizontal plane of the ground 104, thereby providing ingress to and egress from the bed surface 102 of the truck 100. A pair of reinforcing members 18 and 20 are positioned along each of the lateral margins of the first section 12 and second section 14, respectively. Each reinforcing member 18 and 20 is affixed to the first section 12 and the second section 14 along the lateral margins and provides further strength and durability to the replacement tailgate and ramp 10 by maintaining the angular disposition formed between the first section 12 and the second section 14.

The first section 12 includes a first frame 22 having at least a quadrilateral perimeter constructed from a durable material, such as steel or other suitable metals. A lattice covering 28 is affixed to the first frame 22, the lattice covering 28 comprising the durable material used to assemble the first frame 22. The lattice covering 28 is further discussed below in relation to other features provided to the second section 14. The first section 12 lies substantially parallel to the bed surface 102 when the replacement tailgate and ramp 10 is deployed, and lies in a position substantially similar to that of a conventional tailgate provided on trucks. Conversely, retraction of the replacement tailgate and ramp 10 places the first section 12 substantially perpendicular to the bed surface 102. The depth and length of the first section 12 is envisioned as having similar dimensions to the conventional tailgate that the replacement tailgate and ramp 10 is replacing. It is envisioned that the first section 12 may be affixed to the tail end of the truck 100 in several configurations, including insertion of a pair of posts 24 and 26 that depend from the first frame 22 (and first section 12, in general) and insert into the cavities that receive the posts of a conventional tailgate. Other configurations include the use of semi-annular brackets, cylindrical collars or other similar mechanical coupling or attachment devices suitable for securely affixing the posts 24 and 26 to the truck bed. The attachment of posts 24 and 26 to the truck bed requires pivotal movement so that the replacement tailgate and ramp 10 may be adjusted and moved from a deployed position (illustrated in FIG. 1, with the first section 12 parallel to the truck bed and the second section 14 firmly in contract with the ground or street surface 104) and a retracted or stored position (also illustrated in FIG. 1, shown in phantom lines).

The second section 14 includes a second frame 30 having at least a quadrilateral perimeter and constructed from a durable material, such as steel or other suitable metals. A lattice covering 28 is also affixed to the second frame 30, the lattice covering 28 comprising the durable material used to assemble the first frame 22 and second frame 30. The lattice covering 28 provides a frictionally-enhanced (traction) surface to the ramp 10 to prevent slippage of user and/or equipment during loading and unloading. The lattice covering 28 also provides a material that allows air to pass through during automobile transport. Furthermore, the lattice covering 28 allows a driver and/or passenger to view items positioned behind the ramp 10, including other automobiles, obstructions, pedestrians or other items of concern when driving and/or parking the vehicle. It is envisioned that the second section 14 includes two longitudinally elongated inclined planes 32 and 34 and a recess 36 intermediate therebetween. The two inclined planes 32 and 34 and recess 36 are co-planar to one another. The two inclined planes 32 and 34 provide a means for safely loading and unloading material from the bed of a truck 100, especially heavy items such as lawn equipment, machinery or items purchased in bulk packaging. The recess 36 is provided to permit a user to maneuver items into and out of a truck 100 without having to step onto the ramp 10, if so desired. The width of the inclined planes 32 and 34 are substantially identical to one another, providing a pathway sufficiently wide to permit the widest of tires to travel upon. The width of the recess 36 is proportioned to the inclined planes 32 and 34 so as to provide an area of access sufficiently wide for an above-average sized person, but not so wide as to render the use of the inclined planes 32 and 34 in combination ineffective. When the first section 12 is retracted (as shown by the phantom lines of FIG. 1), the second section 14 is retracted as well and maintains an angle "<$\alpha$" approximate to the angle "<$\alpha$" when the replacement tailgate and ramp 10 is deployed for use. The permanent seam or weld 16 and the reinforcing members 18 and 20 provide structural and angular integrity to the second section 14 when retracted, thereby preventing warping, damage or destruction to the replacement tailgate and ramp 10 when retracted.

Figure 3:
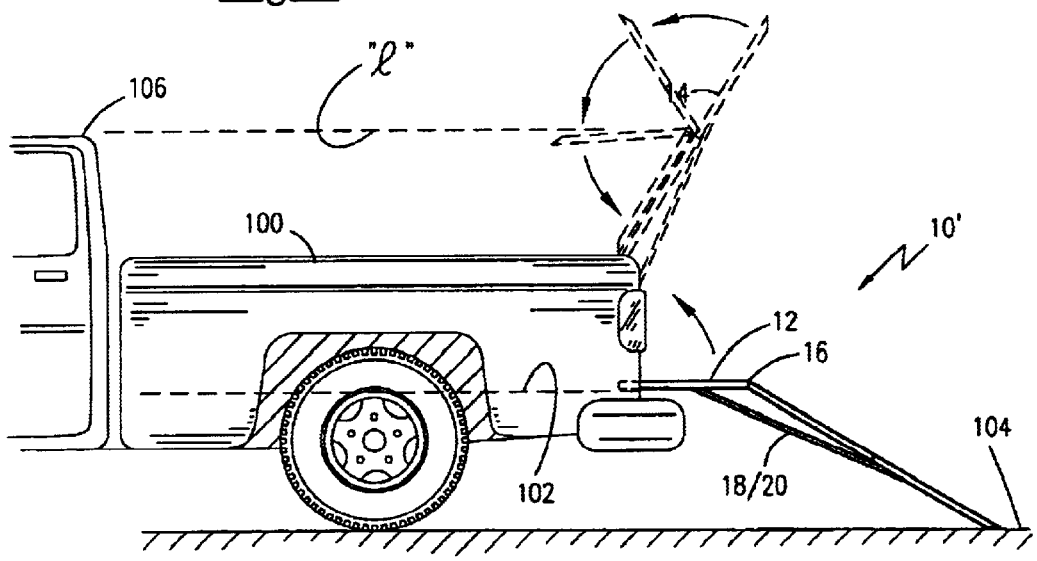
FIG. 3 is a side view of an alternative embodiment of the tailgate/ramp, wherein the tailgate/ramp includes a second section having an upper section and a lower section coupled about a hinge that allows the lower section to pivot and rest adjacent to and/or against the upper section when the tailgate/ramp is retracted, and the retraction reduces the aerodynamic resistance and/or drag on the vehicle.
Figure 4:
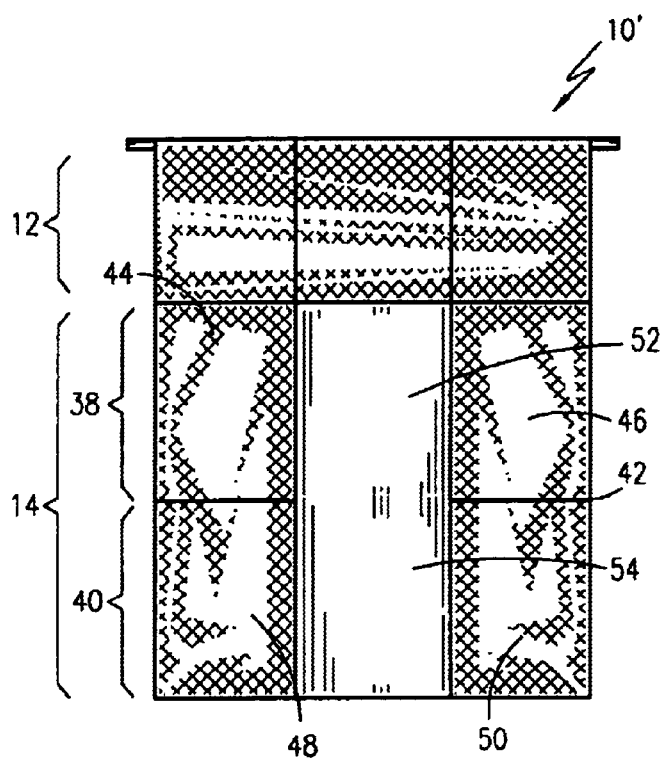
FIG. 4 is a top view of the alternative embodiment illustrated in FIG. 3, illustrating the upper and lower sections and the hinge that couples the sections together.

Referring now to FIG. 3 and FIG. 4, an alternative embodiment of the present invention is illustrated. The replacement tailgate and ramp 10' comprises a first section 12 and a second section 14 affixed about a permanent seam or weld 16. In contrast to the preferred embodiment disclosed above, the second section 14 (and thus, each of the pair of inclined planes 32 and 34) comprises an upper section 38 and a lower section 40 coupled about a hinge 42. Reinforcing members 18 and 20 are affixed to the first section 12 and to the upper section 38 so as to provide reinforcing strength and durability to the tailgate/ramp 10, similarly as the reinforcing members 18 and 20 are described in relation to the preferred embodiment. The upper section 38 and the lower section 40, in combination, are substantially identical in dimension to the second section 14 disclosed in the preferred embodiment above. The upper section 38 and the lower section 40 are substantially identical in dimension to one another, divided by the hinge 42, The upper section 38 and lower section 40 each include a pair of longitudinally elongated inclined planes 44, 46, 48 and 50. Furthermore, the upper and lower sections 38 and 40 each include a recess 52 and 54 intermediate to the respective inclined planes 44, 46, 48 and 50. Each section 38 and 40 includes the lattice covering 28 as disclosed previously. The hinge 42 is provided to allow the lower section 40 to pivot or fold onto the upper section 38 when the replacement tailgate and ramp 10 is retracted (shown in phantom in FIG. 3). The lower section 40 pivots away from the outside of the truck bed and toward the cab of the truck, as illustrated by the phantom lines and directional arrows in FIG. 3, until the lower section 40 rests adjacent to and/or abuts against the upper section 38. The division of the second section 14 into an upper and lower section 38 and 40 provides a means for reducing the aerodynamic resistance that might otherwise result from the arrangement described in the preferred embodiment, wherein the second section 14 maintains a taller profile than the folded arrangement. Although the preferred embodiment is an improvement over existing tailgate and/or ramp replacement apparatuses, notably because of the latticed covering 28 allows air to pass through the tailgate/ramp 10, the pivoting lower section 40 provides a tailgate/ramp 10 that rests well below the top portion of the cab 106 (indicated by the broken line "l") of a truck 100, thereby further reducing aerodynamic resistance and/or drag. Reduction of aerodynamic resistance and/or drag is associated with improved gas mileage and better control and/or handling of the vehicle.

Figure 5:
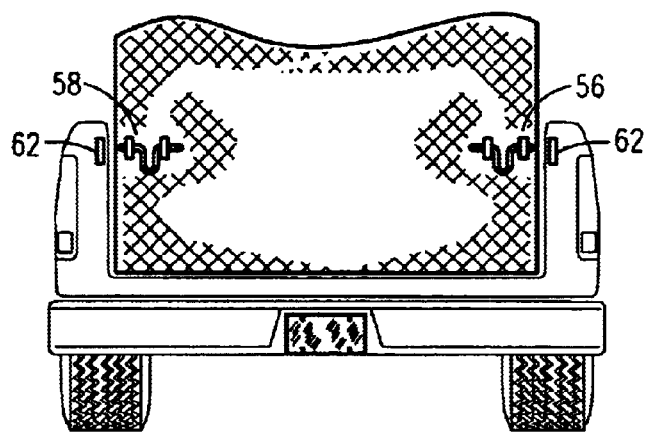
FIG. 5 is a rear perspective of the tailgate/ramp retracted and illustrating securement means, herein shown as a slidable pin and housing with an aperture.
Figure 6:
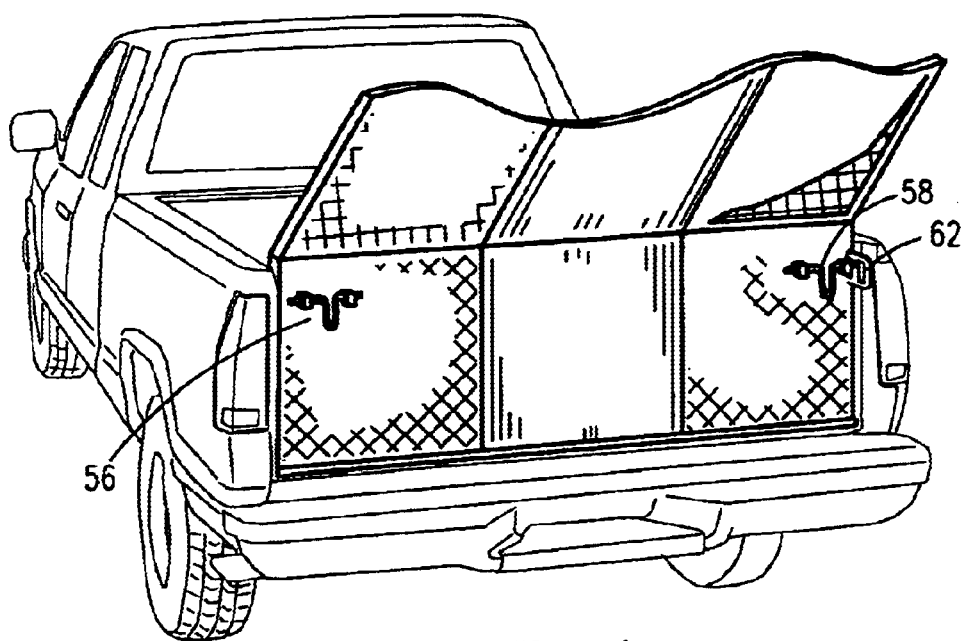
FIG. 6 is a perspective view of the tailgate/ramp retracted.
Figure 7:
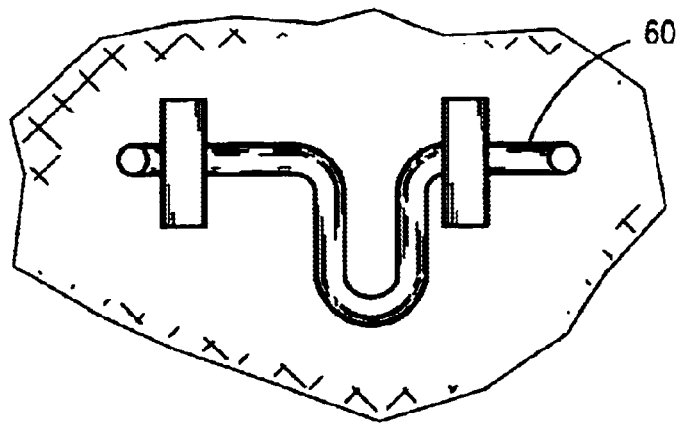
FIG. 7 is a perspective view of securement means (slidable pin and housing), a magnified perspective of the sliding pin and housing.
Figure 8:
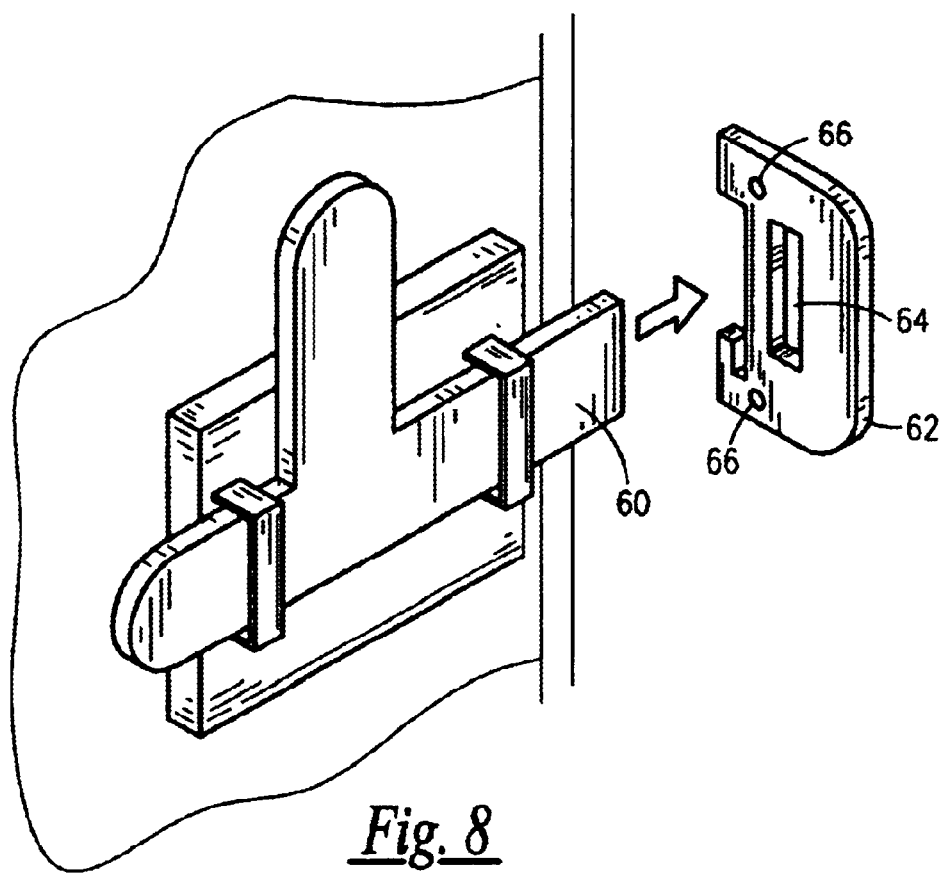
FIG. 8 is a perspective view of an alternative embodiment of the sliding pin.

Referring now to FIG. 5, FIG. 6 and FIG. 7, securement means 56 is shown in accordance with the preferred embodiment and the alternative embodiment of the present invention previously disclosed. In FIG. 5, a view taken from the perspective of looking toward the tailgate from outside the truck is provided to illustrate a pair of securement means 56 and 58 affixed to the underside of the tailgate/ramp 10 and used to secure the tailgate/ramp 10 in an upright and retracted position when not in use. The securement means 56 and 58 is envisioned as having a plurality of configurations and/or styles, including one embodiment disclosed in FIG. 5, FIG. 6 and FIG. 7, a sliding pin 60 inserted into a housing 62 (illustrated as broken lines in FIG. 5). The pin 60 is inserted into an aperture 64 formed on the housing 62, thereby lockably and securely impinging the tailgate/ramp 10 from pivoting about the posts 24 and 26. The pin 60 slides laterally so that the pin 60 may be inserted and/or removed from the housing 62 as desired. The housing 62 (as best seen in FIG. 8) further comprises a plurality of cylindrical bores 66 for receiving means for attaching the housing 62 to the truck bed, including use of screws, bolts, or other elongated attachment mechanisms. An alternative embodiment of the sliding pin 60 is illustrated in FIG. 8, wherein the sliding pin 60 has a rectilinear configuration. It is also envisioned that other mechanisms may be employed to provide the secured impingement of the tailgate/ramp 10, including but not limited to the use of combination or key locks secured about a U-bolt affixed to a truck.

It is envisioned that at least one effective and efficient method of manufacturing the replacement tailgate and ramp 10 is the welding of various components of the tailgate/ramp 10 previously described. Other methods of manufacture are also envisioned that are well known in the prior art.

2. Operation of the Preferred Embodiment

For purposes of illustration only, the following description of the operation of the present invention assumes that the tailgate/ramp 10 is in a secured and locked position (retracted position) within the bed of the truck 100. To unload equipment or other items from the bed of the truck 100, a user will slide the pin 60 from the housing 62, thereby releasing one side of the tailgate/ramp 10 from impingement. A user will then slide the other pin 60 from the opposite housing 62, thereby releasing the remaining side. The tailgate/ramp 10 is then lowered until the second section 14 rests against the ground or surface. A user will then load or unload the equipment and/or materials using the tailgate/ramp 10 to access the truck bed. After use, the tailgate/ramp 10 may be retracted and secured in the reverse manner described above.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A replacement tailgate and ramp comprising:
   a first section affixed to a tail portion of a truck;
   a second section, said second section permanently affixed to and angularly disposed from said first section about a weld;
   a pair of reinforcing members, each of said pair of reinforcing members positioned about each lateral margin of said first section and said second section, said pair of reinforcing members maintaining the angular disposition of said first section to said second section; and
   pair of securement means;
   said replacement tailgate and ramp pivotal about said first section between a deployed position, permitting ingress to and egress from a bed surface of the truck, and a retracted position, permitting locomotion of said truck.

2. The replacement tailgate and ramp of claim 1, wherein said first section comprises:
   a first frame comprising a substantially quadrilateral perimeter:
   a lattice covering affixed to said first frame, said lattice covering providing a frictionally enhanced walking surface; and
   a pair of posts, each of said pair of posts depending from said first section along said lateral margins and insertable into cavities in tail portion of the truck, thereby permitting pivoting motion of said replacement tailgate and ramp.

3. The replacement tailgate and ramp of claim 1, wherein said second section comprises:
   a pair of longitudinally elongated inclined planes, each of said pair of inclined planes comprising a lattice covering to provide a frictionally enhanced walking surface; and
   a recess intermediate to said pair of inclined planes.

4. The replacement tailgate and ramp of claim 3, wherein said pair of inclined planes providing means for ingress to and egress from said bed surface.

5. The replacement tailgate and ramp of claim 3, wherein said recess is proportioned to said pair of inclined planes so as to provide an area of access for a person to maneuver transportable items.

6. The replacement tailgate and ramp of claim 3, wherein each of said pair of inclined planes comprise a unitary member.

7. The replacement tailgate and ramp of claim 3, wherein each of said pair of inclined planes comprise:
   an upper section;
   a lower section;
   a hinge coupling said upper section with said lower section.

8. The replacement tailgate and ramp of claim 7, wherein each of said pair of inclined planes foldably collapse about said hinge, said lower section foldably collapsing onto said upper section to reduce profile of said second section when placed into a retracted position.

9. The replacement tailgate and ramp of claim 8, wherein reduction of said profile reduces aerodynamic resistance incurred during transportation.

10. The replacement tailgate and ramp of claim 1, wherein each of said pair of securement means comprises:
    a sliding pin affixed to the underside of said first section; and
    a pin housing affixed to said truck, said pin housing receiving said sliding pin to impinge deployment and excessive movement of said replacement tailgate and ramp.

* * * * *